Dec. 10, 1957 L. A. RUNTON 2,815,793
METHOD AND APPARATUS FOR MAKING FRICTION MATERIAL
Filed March 23, 1956 2 Sheets-Sheet 1
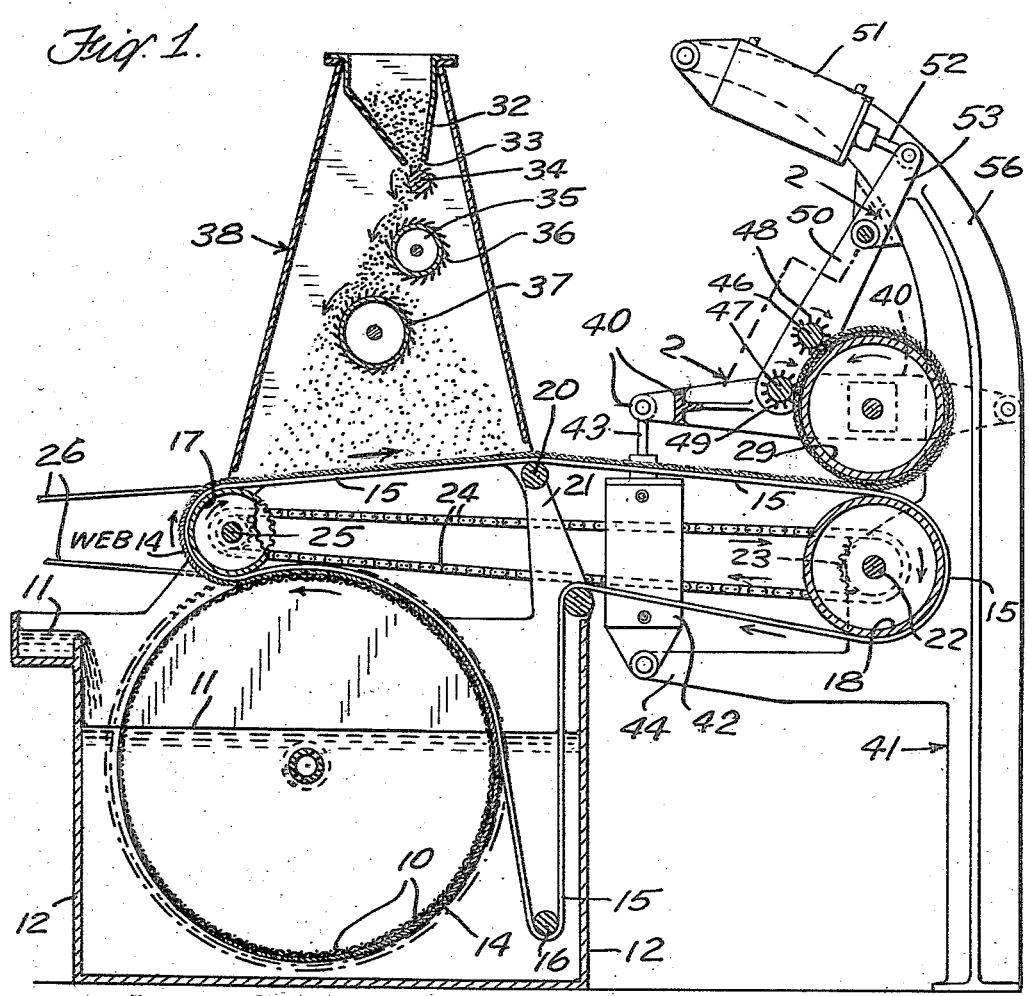
Fig. 1.
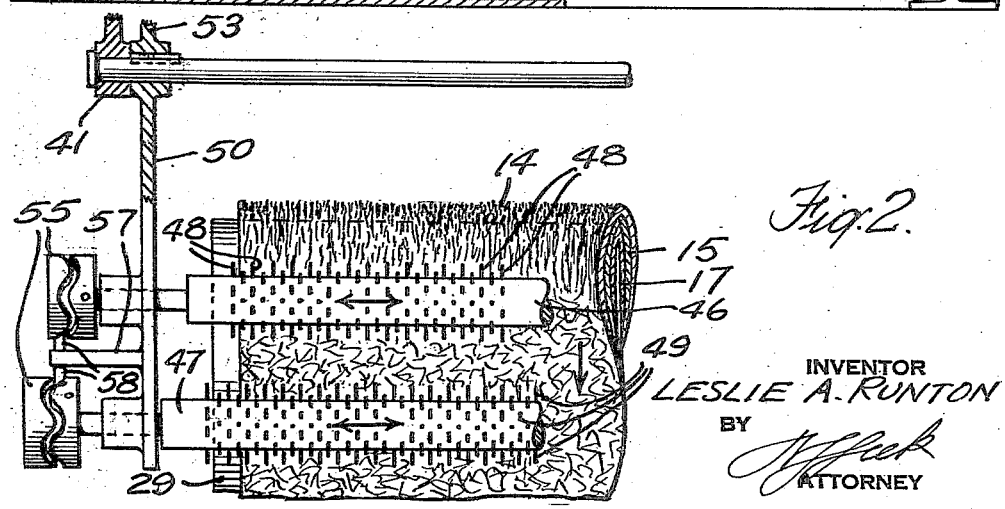
Fig. 2.
INVENTOR
LESLIE A. RUNTON
BY 
ATTORNEY Dec. 10, 1957  L. A. RUNTON  2,815,793
METHOD AND APPARATUS FOR MAKING FRICTION MATERIAL
Filed March 23, 1956  2 Sheets-Sheet 2
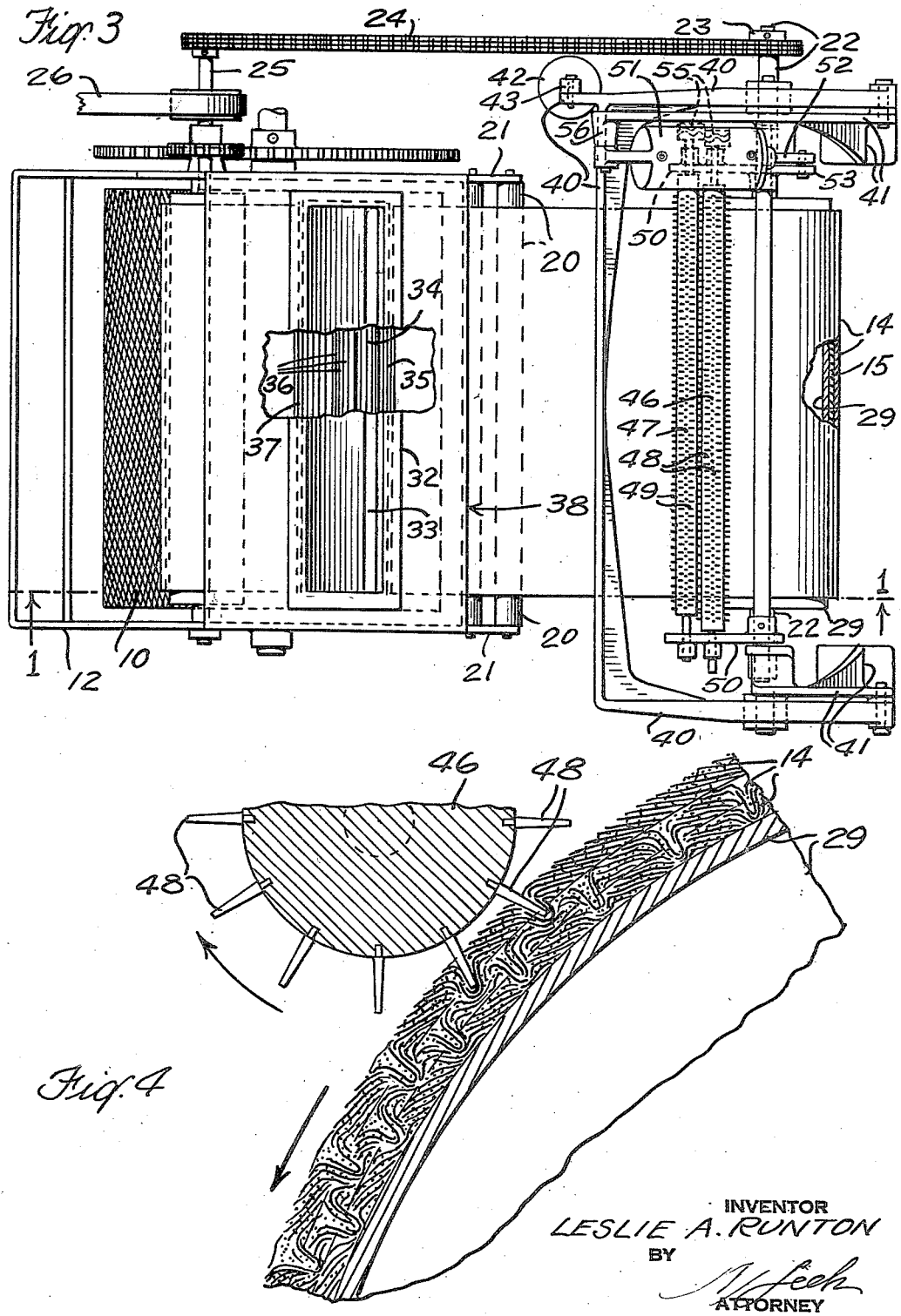
INVENTOR
LESLIE A. RUNTON
BY
ATTORNEY

United States Patent Office 2,815,793
Patented Dec. 10, 1957

2,815,793

METHOD AND APPARATUS FOR MAKING FRICTION MATERIAL

Leslie A. Runton, Middle Haddam, Conn., assignor to The Russell Manufacturing Company, Middletown, Conn., a corporation of Connecticut Application March 23, 1956, Serial No. 573,358

5 Claims. (Cl. 154—1)

This invention relates to a friction material such as a brake lining or clutch facing and to a method and apparatus for making the same.

An object is to provide a friction material of the above type having novel and improved characteristics.

Another object is to provide a novel and improved method and apparatus for the production of such a material on a commercial scale.

Other objects and advantages will be apparent as the nature of the invention is more fully disclosed.

Friction materials of the above type have heretofore been made from a combination of asbestos fibers, resin and rubber formed in layers and vulcanized under pressure. In such products however the layers have a tendency to split or pull apart and the surface tends to glaze in use due to the orientation of the fibers.

The present invention avoids these difficulties and provides a firmly bonded sheet which maintains its friction qualities throughout its useful life.

The nature of the invention will be better understood by referring to the following description taken in connection with the accompanying drawings in which a specific embodiment has been shown for purposes of illustration.

In the drawings:

Fig. 1 is a vertical sectional view of an apparatus taken on line 1—1 of Fig. 3 embodying the invention;

Fig. 2 is an enlarged section taken on the line 2—2 of Fig. 1 showing the arrangement of the spiked rolls;

Fig. 3 is a top plan view of the apparatus of Fig. 1; and

Fig. 4 is an enlarged detail view showing the action of the spiked rolls on the web.

Referring to the drawings more in detail the apparatus comprises a Fourdinier machine having a cylindrical screen 10 rotating in a slurry 11 held in a tank 12.

The slurry 11 consists of a mixture of asbestos fibers, resin and rubber, beaten up in water to form a slurry from which the solids are picked up on the surface of the rotating screen 10 to form a fiber layer 14. The resin bonding agent which in itself forms no part of the invention may be of any type known in the art, for example, a phenolformaldehyde type resin as set forth in Patent No. 2,676,125 dated April 20, 1954.

The picked-up layer 14 is transferred to an endless apron 15 such as a woven wool belt which is held by guide rolls 16 and 17 against the layer 14 on the cylinder 10. The apron 15 then passes around rolls 17 and 18 in a horizontal flight. A roll 20 carried on bracket 21 supports the apron 15 midway between guide rolls 17 and 18. These guide rolls support the apron 15 and web or layer 14 which has been stripped from the cylinder 10 as the apron passes around the roll 17.

The roll 18 is shown as mounted on a shaft 22 carrying a sprocket 23 which is driven by a chain 24 from a drive shaft 25. The shaft 25 is driven by any suitable means such as a belt 26.

The web 14 is wrapped around a drum 29 which rests upon the web on the apron 15 over the roll 18 in successive layers until it builds up to the desired thickness.

As the web 14 advances with the apron 15 a friction material such as brass chips or other metal in granular form is sprinkled over the surface thereof. For this purpose the chips are loaded into a hopper 32 having a discharge slot 33 at the bottom registering with a rotating grooved roll 34. The roll 34 withdraws the chips from the hopper and discharges them onto a roll 35 having a grooved surface 36, which in turn discharges the chips onto a similar grooved roll 37. The rolls 34, 35 and 37 rotate at successively higher speeds in the direction indicated by the arrows, Fig. 1, and serve to spread the chips in the form of a spray over the surface of the web 14. Closures 38 confine the spray to the desired area.

The metal chips carried on the surface of web 14 are wrapped between successive layers of the web on the drum 29 and are thus dispersed through the laminated built-up web on the drum.

The drum 29 is carried in a frame 40 which is pivoted to pedestals 41 and is shifted by a fluid actuated cylinder 42 having a piston provided with a rod 43 which is pivotally attached to frame 40. The cylinder 42 is pivoted to a bracket 44 carried by the pedestal 41. The cylinder 42 is controlled by suitable control valves or switches to normally hold the drum 29 under pressure against the web on the apron 15 so as to compact the web and remove water therefrom. The cylinder also provides a stop (not shown) to hold the drum 29 out of contact with the apron 15 when no web is present and may be actuated to lift the drum 29 when the built-up web is to be slit and removed therefrom as a sheet for processing.

In accordance with this invention a pair of rolls 46 and 47 having pins or spikes 48 and 49 projecting from the surface thereof are journalled in a frame 50 pivotally attached to the pedestals 41. The spiked rolls 46 and 47 bear against the web on the drum 29. A fluid actuated cylinder 51 pivoted on an arm 56 of the pedestal 41 carries a piston having a rod 52 which is pivotally connected to an ear 53 on the frame 50 and is adapted to hold the rolls 46 and 47 in pressure engagement with the web on the drum 29 or to lift the rolls 46 and 47 therefrom as required.

The spiked rolls 46 and 47 are driven by the web on the drum 29. The spikes 48 and 49 pierce the web and are of a length to pass through one or two layers of the web so as to rearrange and reorient the fibers and to cause the fibers at the interface of two layers to be interleaved so as to eliminate the interface and bond the layers together. The fibers in the entire web are thus randomly arranged with the metal chips dispersed throughout the web.

The spiked rolls may be oscillated axially by cams 55 which are individually secured to the shafts of the spiked rolls 46 and 47. A bracket 57 (Fig. 2) integral with one of the arms of the frame 50 supports two opposed cam followers 58 projecting from opposite sides of the bracket 57. The cams 55 are provided with sinuous grooves in which the cam followers ride. The cams are identically grooved but are secured out of phase on their respective shafts to oscillate the spiked rolls axially so as to further upset the fibers and to enhance their random arrangement. The cylinder 51 may include stop means to prevent the spikes from striking the drum 29.

The action of the spiked rolls on the fibers is shown in Fig. 4 in which it will be seen that the tilting of the spikes as the roll rotates causes them to shift the fibers peripherally as well as to force the outer fibers inwardly and thus produce a random arrangement in which the interface between layers is practically eliminated.

When the web has built up on the drum 29 to the desired thickness it is slit axially and removed as a flat sheet. It is then pressed and dried. The brake linings or clutch facings or other friction shape is then cut from the sheet and is die molded under heat and pressure to vulcanize the rubber or to cure the resin.

The die molded product is hard and homogenous. It does not have zones of weakness at the interface and hence the layers do not separate during use. Also since the metal chip is uniformly dispersed the product retains its characteristics throughout its useful life and regardless of wear.

What is claimed is:

1. The method of making a friction facing which comprises forming a web composed of asbestos fibers and a heat-hardenable bonding agent, wrapping a plurality of layers of said web on a drum, piercing more than one layer of said web with a plurality of pins while oscillating the pins axially of the drum to reorient the fibers and to break up the interface between layers, removing the web from said drum as a felted sheet, drying the sheet, cutting the friction facings from said sheet and die molding the same under high pressure at a temperature to form a hard, homogenous friction facing.

2. The method of making a friction facing which comprises forming a web composed of asbestos fibers, and a heat-hardenable bonding agent, dispersing metal chips over the surface of said web, wrapping the web on a drum to build up a sheet having a plurality of layers with the metal chips disposed therebetween, piercing the sheet with a plurality of pins extending through more than one layer thereof while oscillating the pins axially of the drum to disperse and reorient the fibers and to break up the interface between layers, removing the sheet from said drum, cutting the friction facings therefrom, and die molding said facings under high pressure at a temperature to form a hard, homogenous facing with the metal chips dispersed therethrough.

3. Apparatus for making a laminated sheet from a web composed of asbestos fibers, comprising a conveyor for carrying said web along a horizontal path, a source of metal chips, means disposed over said path to disperse said chips over the surface of said web, a drum to receive said web from said conveyor, a spiked roll mounted to be driven by the web on said drum and to pierce at least one layer of the web, and means oscillating said roll axially as it rotates for reorienting the fibers.

4. Apparatus for making a laminated sheet from a web composed of asbestos fibers, comprising a conveyor for carrying said web along a horizontal path, a source of metal chips, means disposed over said path to disperse said chips over the surface of said web, a drum to receive said web from said conveyor, a spiked roll mounted to be driven by the web on said drum and to pierce at least one layer of the web for reorienting the fibers and means oscillating said roll axially for upsetting said fibers.

5. Apparatus for making a laminated sheet from a web composed of asbestos fibers, comprising a conveyor for carrying said web along a horizontal path, a source of metal chips, means disposed over said path to disperse said chips over the surface of said web, a drum to receive said web from said conveyor, a spiked roll mounted to be driven by the web on said drum and to pierce at least one layer of the web and means oscillating said roll axially as it rotates for reorienting the fibers and fluid pressure means connected to lift said roll from said drum.

References Cited in the file of this patent

UNITED STATES PATENTS

| | | |
|---|---|---|
| 139,466 | Herboth | June 3, 1873 |
| 409,918 | Carpenter | Aug. 27, 1889 |
| 1,608,165 | Brown et al. | Nov. 23, 1926 |
| 2,158,533 | Cavey | May 16, 1939 |
| 2,691,326 | McArn | Oct. 12, 1954 |

FOREIGN PATENTS

| | | |
|---|---|---|
| 380,310 | Great Britain | Sept. 15, 1932 |